No. 666,351. Patented Jan. 22, 1901.
J. W. PATTERSON.
COIN OPERATED FIELD GLASS, &c.
(Application filed May 24, 1900.)
(No Model.)
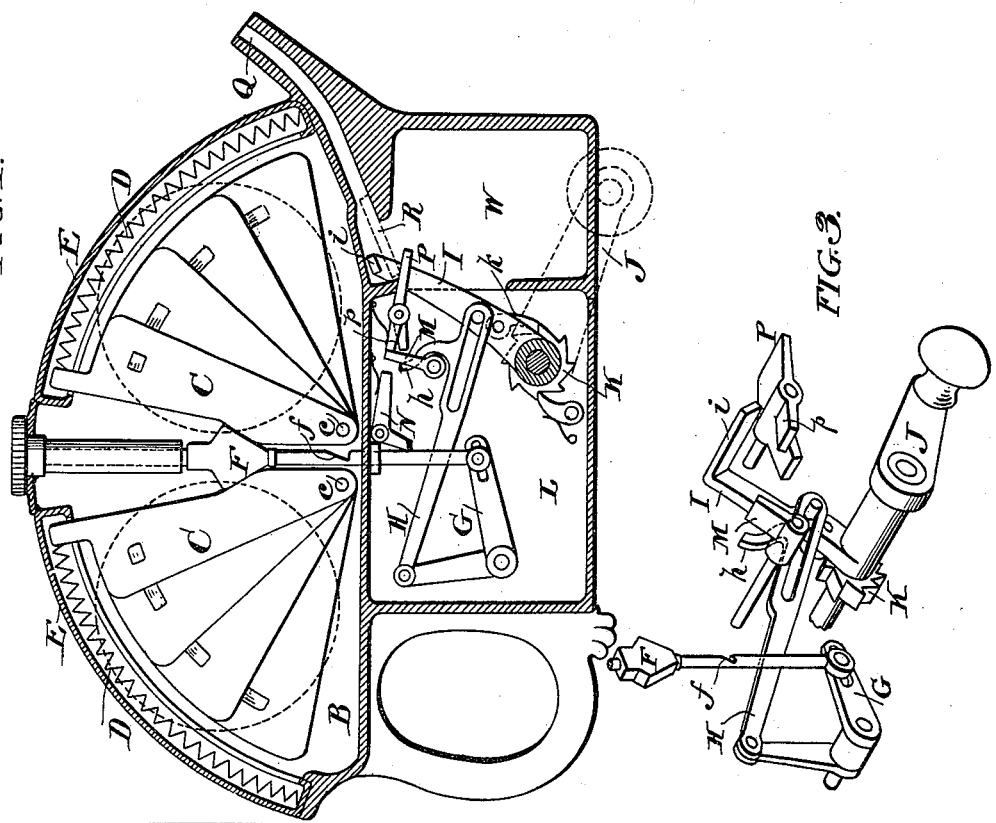
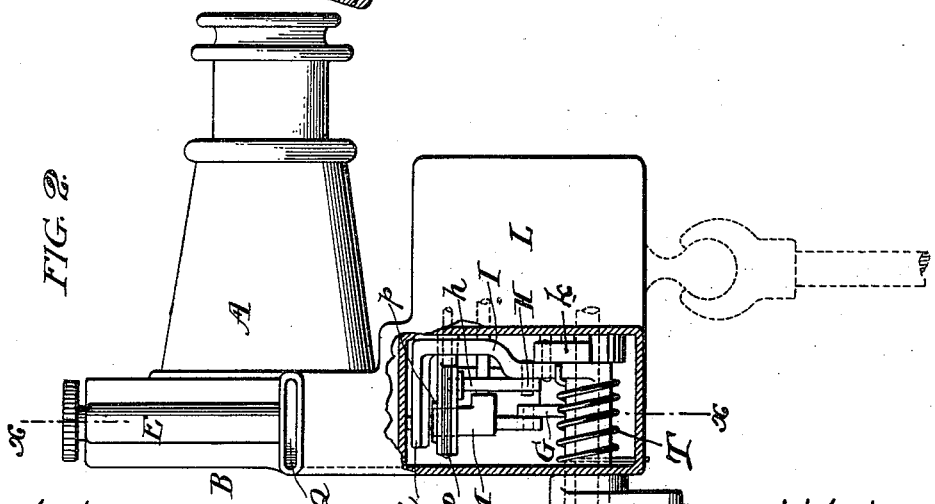
WITNESSES.
INVENTOR.
James W. Patterson

UNITED STATES PATENT OFFICE.

JAMES W. PATTERSON, OF NEW YORK, N. Y.

COIN-OPERATED FIELD-GLASS, &c.

SPECIFICATION forming part of Letters Patent No. 666,351, dated January 22, 1901.

Application filed May 24, 1900. Serial No. 17,783. (No model.)

*To all whom it may concern:*

Be it known that I, JAMES W. PATTERSON, of the city of New York, county of Kings, and State of New York, have invented an Improvement in Coin-Operated Opera, Field, or Marine Glasses, of which the following is a specification.

My invention has reference to coin-operated opera, field, or marine glasses; and it consists of certain improvements which are fully set forth in the following specification and shown in the accompanying drawings, which form a part thereof.

The object of this invention is to provide a suitable mechanism in connection with opera, field, or marine glasses which on the deposition of a coin may be brought to an operative condition by the removal of an obstructing shutter or screen device normally in the field of view and which shall automatically reinsert or interpose said obstructing device after a given time of use has passed, so that the glasses may be used only for a reasonable period upon the deposition of a single coin.

The object is also to make the glasses automatic in relocking or resetting them to avoid the necessity of an employee going around to where the glasses are attached or located and relocking them by manual operations.

My invention comprehends, broadly, an automatic relocking device for preventing the use of the glasses beyond a given time.

In carrying out my invention I provide suitable shutter or obstructing device or devices adapted to be interposed in front of the object-lenses, combined with means for displacing said shutters or devices from in front of the object-lenses, automatic means for returning them to such a position, and a clockwork mechanism which after a given period will automatically cause said resetting mechanism to come into action for the purpose of causing the said shutters or obstructing devices to again obstruct the line of sight through the object-lenses.

My invention will be better understood by reference to the accompanying drawings, in which—

Figure 1 is a sectional elevation of my improved automatic coin-actuated glasses on line $x\ x$ of Fig. 2. Fig. 2 is a side elevation of same, and Fig. 3 is a perspective view illustrating the operating mechanism for the screens or shutters.

A indicates the glasses, which, as shown, are of the type commonly known as "opera-glasses." It is, however, to be understood that my invention is not confined to any character of telescopic glasses, whether single or double, but includes the application to opera-glasses, field or marine glasses, telescopes, and microscopes, whether monocular or binocular. At one end of the glasses is arranged a case B, in which are located the pivoted shutters C. These shutters consist of a series of plates pivoted at $c$ and flexibly connected at their outer ends similar to a fan. The uppermost of these plates project into guide-tubes E, in which are arranged coil-springs D, said springs acting to open the fan-screens, as indicated in Fig. 1. Interposed between the two fan-screens C C is an operating-wedge F, suitably guided vertically and adapted upon being depressed to press the several blades of the fan-screens down upon each other similar to closing a fan, under which action the object-lenses of the opera-glasses A are exposed. This wedge F is connected at the lower end to a bell-crank G, which is operated by a slotted link H, jointed to the lever I, which is in turn operated by the hand-crank J, extending outside of the case.

By turning the handle J downward or to the right the wedge F is depressed to open the fan-screens and is locked in this position by the pivoted locking-pawl N, which catches in the notch $f$ of the lower projection of the wedge structure. Upon liberating the handle J the spring T returns it to its normal position, as shown in Fig. 1. The handle J is also adapted to wind up the spring of a clockwork L by means of the pawl-and-ratchet devices K. The ratchet is connected to the usual spring-arbor and is turned by a suitable pawl $k$ on the arm I.

M is a pivoted arm adapted to be rotated at a slow speed by the clockwork L, and said arm is locked by the pivoted lever P. The pivoted lever P also has a shoulder $p$, which is adapted to form an obstruction to a lug $h$ on the link H, so as to prevent the shutters or screens C being opened unless a coin is first placed in the machine, so as to move the locking-lever P out of position.

The coin is deposited in the coin-slot Q and slides into the position indicated at R, one end resting above the lever P. When the arm I is turned downward, its end $i$ forces the coin into the compartment W and in doing so depresses the free end of the lever P, thereby liberating the arm M, which begins to rotate. The glasses may now be used for a period equal to that required for the arm M to make a revolution, which, if desired, may be a few minutes or an hour or more, as predetermined. When the arm near the completion of its revolution strikes the end part of the pivoted locking-pawl M, the latter is raised out of the notch $f$ and frees the wedge, which is raised by the spreading of the fan-shutters C under the action of their springs D. As soon as this is done the arm M is again arrested by the pivoted lever P, which locks the clockwork from further running down. In this manner the clockwork is always maintained in a wound-up condition, and the act of putting the glasses in operative condition for use always rewinds the spring to compensate for the extent for which it was run down for the previous action. This obviates the necessity of winding up the clockwork by an employee or of employing an expensive clock mechanism. It also permits the clockwork to be made small and less bulky, which is important, since it reduces the weight. It will be observed that in this construction the shutters are automatically reset to prevent the glasses from being used beyond a given time and entirely avoids the necessity of an operator going around to each opera-glass and resetting the screens.

While I have shown the screens as made in fan form, it is to be understood that I do not limit myself to any character of screen, as my invention comprehends, broadly, automatic mechanism for resetting the screens, obviating the necessity of manual labor after the glasses have been used. I have therefore simply shown my most improved type of screen. If desired, the screen may be of solid form, such as illustrated in Patent No. 395,345, dated January 1, 1889, in which a single movable blade or part is employed in front of each lens.

While the constructions herein set out are excellently adapted to the purpose of my invention, I do not limit myself to the minor details, as these may be modified in various ways without departing from the principle of my invention.

What I claim as new, and desire to secure by Letters Patent, is—

1. The combination of an opera, field, marine or other telescope, with means to obstruct the view through the lenses, hand-operated means controlled by the coin to remove the obstructing means from in front of the lenses, and a coin-operated self-resetting mechanism adapted to automatically reset the means for obstructing the view after a given period of use.

2. An opera-glass or other telescope, combined with one or more screen devices to obstruct the field of view, a hand-operated mechanism for removing the screen or screens from in front of the lens or lenses, a locking mechanism for holding said screen or screens out of obstructing position, a clockwork mechanism for releasing the resetting screen or screens, and coin-controlled devices for putting the clockwork into operation.

3. An opera-glass or other telescope, combined with one or more screen devices to obstruct the field of view, a hand-operated mechanism for removing the screen or screens from in front of the lens or lenses, a locking mechanism for holding said screen or screens out of obstructing position, a clockwork mechanism for releasing the resetting screen or screens, a coin-controlled device for putting the clockwork into operation, and connecting mechanism between the hand-operated part and the clockwork whereby the latter is wound up simultaneously with the removal of the screen or screens and at or about the time the clockwork is put into operation.

4. In an opera-glass or other telescope, an obstructing-screen consisting of a series of blades pivoted together at one end and flexibly connected at the other end so as to open and close like a fan, automatic means for spreading the blades of the screen to obstruct the view through the lens or lenses, and hand-operated devices for closing the blades one upon the other for exposing the field of view through the lens or lenses.

5. In an opera-glass or other telescope, an obstructing-screen consisting of a series of blades pivoted together at one end and flexibly connected at the other end so as to open and close like a fan, automatic means for spreading the blades of the screen to obstruct the view through the lens or lenses, hand-operated devices for closing the blades one upon the other for exposing the field of view through the lens or lenses, and coin-controlled devices for controlling the operation of the hand-operated means.

6. An opera-glass or telescope, combined with a fan-like screen composed of a series of blades adapted to open and close like a fan, a curved slotted tube E arranged adjacent to the outer edge of the screen, a coil-spring D in said tube connecting with one of the end blades of the screen, power devices acting upon said end blade to oppose the action of the spring whereby the spring spreads the blades to obstruct the view, and the power devices to oppose the action of the spring for condensing the screen.

In testimony of which invention I have hereunto set my hand.

JAMES W. PATTERSON.

Witnesses:
GEO. JOS. SCOTT,
E. M. VANLOON.